Dec. 1, 1959  D. C. HILTY  2,915,380
REFINING MOLTEN PIG IRON
Filed Feb. 8, 1956  2 Sheets-Sheet 2

INVENTOR.
DONALD C. HILTY
BY
*John F. Hohmann*
ATTORNEY

United States Patent Office 2,915,380
Patented Dec. 1, 1959

2,915,380

REFINING MOLTEN PIG IRON

Donald C. Hilty, Niagara Falls, N.Y., assignor to Union Carbide Corporation, a corporation of New York Application February 8, 1956, Serial No. 564,250

18 Claims. (Cl. 75—52)

This invention relates to a process for refining molten pig iron, and refers more particularly to a process for refining such iron for use in the manufacture of steel.

The traditionally practised process of manufacturing steel is an indirect one. Iron ore is first reduced to produce pig iron, and pig iron is then refined to produce steel. While at first blush this system may appear to the uninitiated to be inefficient and roundabout, experience has shown that, at least in the present state of development of the art, it is far and away superior in flexibility to any more direct method so far proposed and produces steel of fine quality at relatively much lower cost.

Nevertheless, there is room for improvement in efficiency and economy. For instance, the modern blast furnace produces pig iron which contains on the average about 0.9% to 2.5% silicon and 3.5% to 4.5% carbon. But in the refining furnaces generally complete removal of silicon is required, and the vast bulk of steel produced today contains no more than about 0.3% carbon. This means that substantially all of the silicon and most of the carbon must be removed in the refining furnaces. The refining operation is of course one of the most costly of all in the manufacture of steel and any reduction in time required to accomplish the necessary refinement would yield savings in refractories, fuel and labor for each heat and even more important, would make possible the production of greater quantities of steel in each furnace over a given period of time. This would make possible increased steel production without the necessity for equally increased capital investment for refining furnaces.

Over the years substantial strides have been taken toward such a goal. One of the most important of these has been the use of "hot metal" in the open hearth. Whereas, originally pig iron was cast and allowed to solidify only to be remelted in the refining furnace, today it is collected in a "hot metal mixer" which is a vessel large enough to hold several heats of molten pig iron. By the use of the mixer it is possible to obtain large tonnages of iron of a uniform composition. By charging molten pig iron (hot metal) to the open hearth, much time is saved. However, the hot metal technique is not feasible in the arc furnace, for the high silicon content of the molten pig iron leads to the formation of voluminous slag and the high carbon content leads to the formation of large volumes of gas, both of which prevent satisfactory operation. Consequently, most electric furnace steel made today is made from a cold charge. And despite the use of hot metal in the open hearth, refining time for a 250 ton heat generally averages about 12 hours.

Ever since the discovery of the process of refining molten iron by blowing it with air in a converter, there have been sporadic attempts to adapt this process to the treatment of molten pig iron either to perform partial refinement prior to charging it to the open hearth, or, particularly in the early days of the industry, to produce steel in a simpler, less costly vessel than a converter. In some suggested methods pig iron would be produced, allowed to solidify, and then remelted in a cupola. The remelted iron would then be subjected to the action of a blast of air while in contact with a solid fuel. In other proposals, molten pig iron would be treated directly with a blast of air, oxygen, or in some cases, hydrogen. In these proposed methods, the treating gas was directed at the metal in a variety of ways: at the top of a pool in a ladle; across a flowing stream of metal in a trough; at the surface of cascades of metal falling down a tower. However, none of these suggestions has been commercially adopted to any great extent, for all suffer from disadvantages, such as destruction of refractories and loss of metal, which outweigh the anticipated advantages.

The present invention has for its principal object a process for refining molten pig iron which is free of the disadvantages of prior proposed methods. More specifically, an important object of the invention is a process for lowering the silicon and carbon contents of molten pig iron by the action of oxygen thereon.

Another object is a process for refining molten pig iron which can be integrated into conventional steel manufacturing operations.

A related object is such a process which also provides a gas of high calorific value.

Still another object is the provision of a refined molten pig iron suitable for charging to a refining furnace of any type, such as the open hearth or the arc furnace, in molten condition.

These and other objects are achieved by the invention which will be described with reference to the drawings in which.

The invention comprises a process of refining molten pig iron in which the surface-to-mass ratio of the molten iron is greatly increased by dispersing it into discrete droplets and in which the droplets so produced are caused to fall freely in a substantially vertical path while in intimate contact with a flowing stream of oxidizing gas, the paths of the droplets and the gas stream being substantially parallel. The exposure of a great surface area of each droplet relative to its mass makes possible quick reaction with the oxidizing gas and very rapid removal of silicon from the iron and partial decarburization. Continued contact between the molten iron and the oxygen results in substantial decarburization. The paths of the falling droplets and the oxidizing gas may be concurrent, but preferably are countercurrent.

Figure 1:
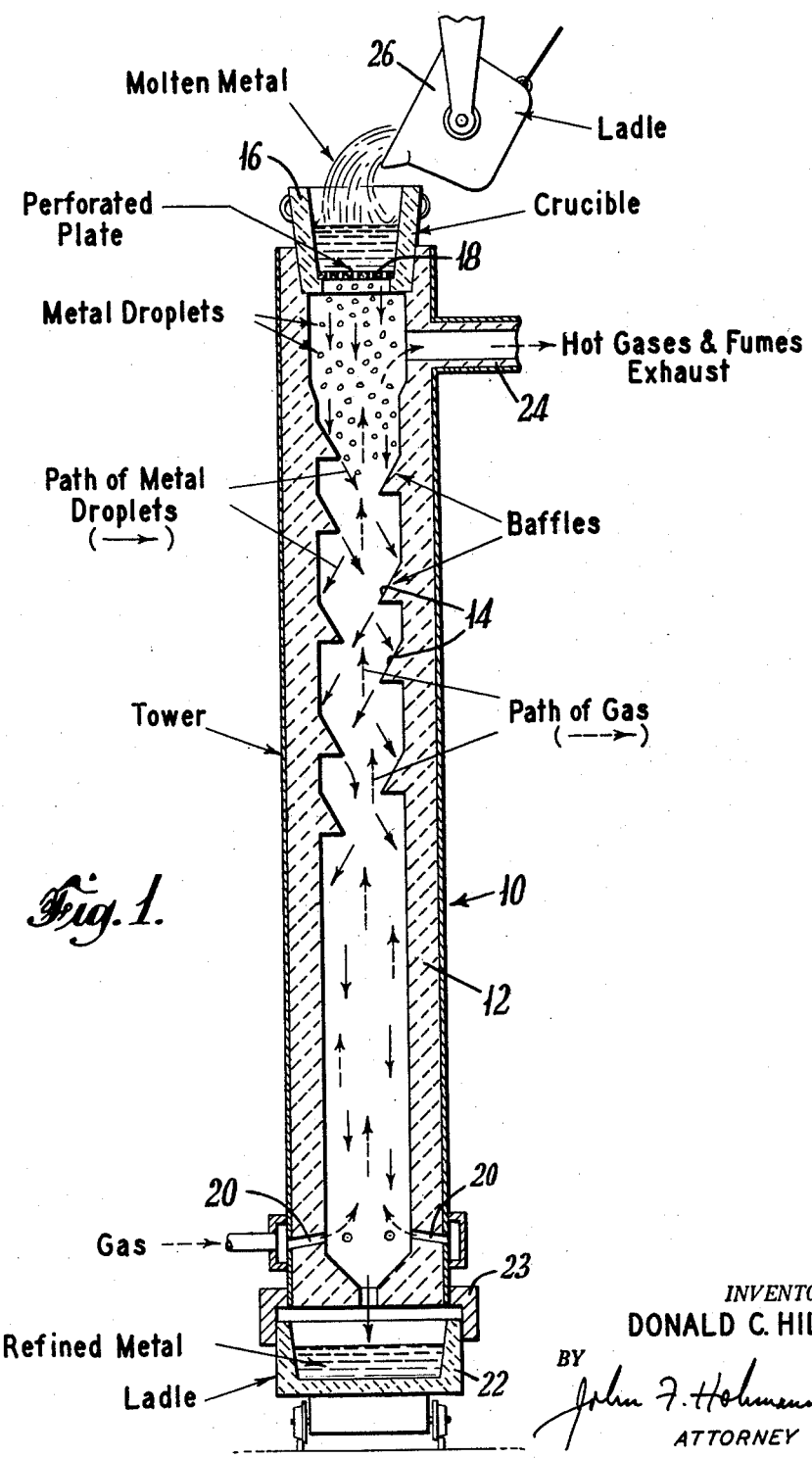
Fig. 1 is a vertical section of a suitable apparatus for use in the practice of the invention.

Although a number of ways of dispersing or disintegrating the molten iron to be treated exist, such as by ejecting it from a revolving nozzle, directing a stream against a revolving drum, or by impinging high velocity gas streams against a stream of molten iron, the most convenient, effective, and economical way of accomplishing this so far discovered is to pass the molten iron through a perforated plate mounted at the top of a tower much like a shotting tower. For a better understanding of the principles of the invention and of a simple apparatus for the best mode of practising it, reference may be had to Fig. 1 of the drawing.

As illustrated, a tower 10 having a refractory lining 12 is open at both ends. A plurality of baffles 14 may be provided on the tower walls. On the upper end of the tower 10 rests a crucible 16 having a removable, perforated bottom plate 18, suitably of graphite or aluminum oxide. Near the tower bottom are a plurality of tuyeres 20 for admitting oxygen, and below the open bottom end is a receiving ladle 22 for collection of treated iron. To prevent escape of smoke and metal, a sealing member 23 is provided between the ladle 22 and tower 10. An outlet 24 for exhaust gas, smoke, and fume is provided near the top of the tower 10.

In the practice of the invention utilizing the apparatus just described, molten pig iron to be treated is poured from a ladle 26 into the crucible 16 from whence it passes through the perforated plate 18 which assists in the formation of discrete droplets. The droplets fall freely into the tower 10. Oxygen is admitted through the tuyeres 20 and flows parallel but countercurrent to the path of the falling droplets. When baffles are employed, some of the droplets may fall upon them and rebound. The treated metal is collected in the receiving ladle 22, and exhaust gas, smoke and fume pass out the outlet 24.

Figure 2:
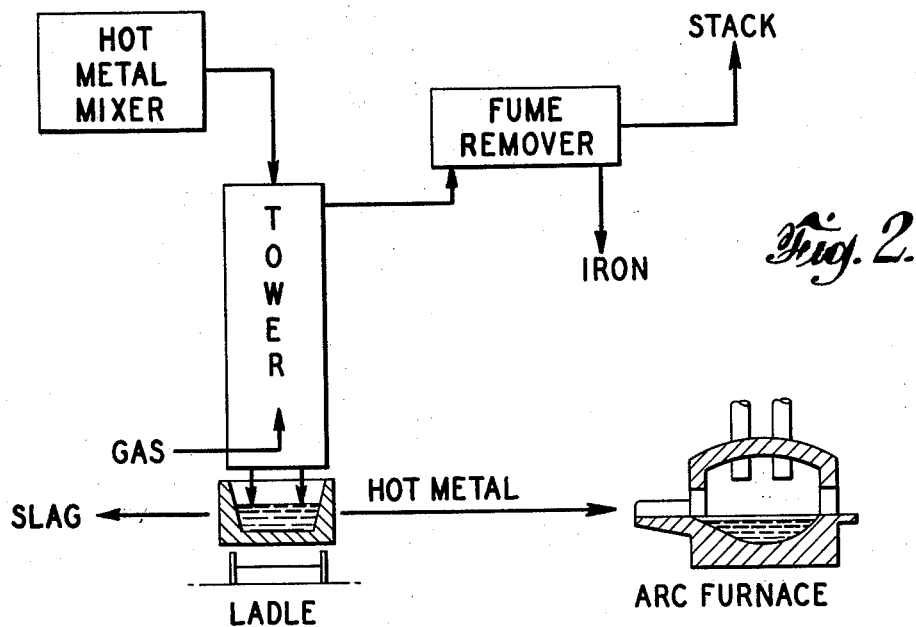
Fig. 2 is a flow sheet of a refining process embodying the invention.
Figure 3:
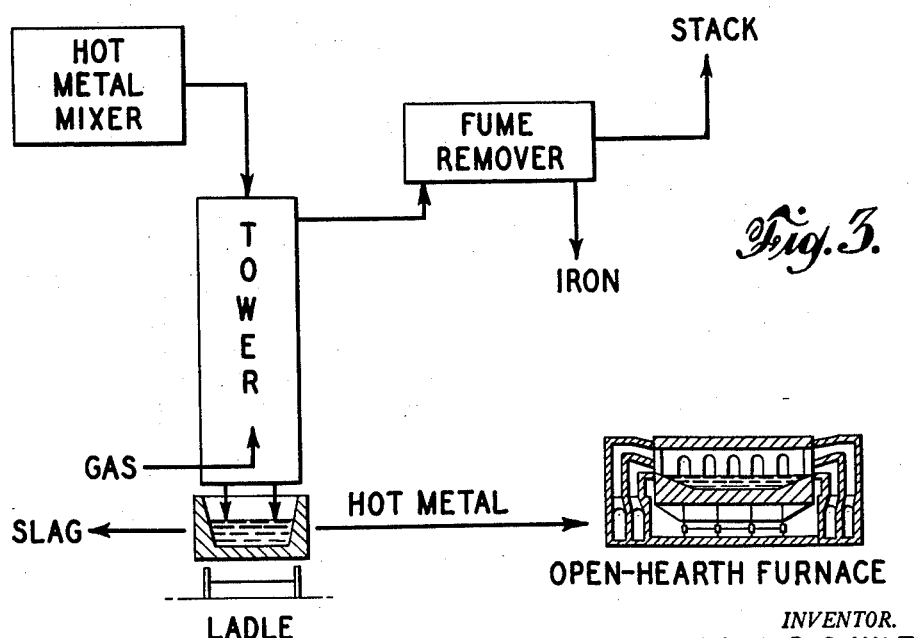
Fig. 3 is a flow sheet similar to Fig. 2 showing a different embodiment of the process of the invention.

An outstanding advantage of the process of the invention conducted as described is the ease with which it may be integrated into conventional steelmaking practice. Reference to Figs. 2 and 3 illustrates such integration.

For instance, metal to be treated is derived from a conventional hot metal mixer and fed into a tower where it is subjected to the action of an oxidizing gas. Treated metal and slag are received in a ladle and the hot metal separated from the slag may be fed directly into a refining furnace such as an arc furnace (Fig. 2) or an open hearth furnace (Fig. 3). The exhaust gas, smoke and fume are treated in suitable apparatus to be referred to below in more detail for the removal of fume and the recovery of iron. The gas, which under the most desirable operating conditions has a high calorific value, may be utilized as desired.

A number of actual tests for the treatment of large quantities of pig iron have demonstrated not only that the process is effective, rapid and economical, but that a number of variables exist. One variable, for instance, is the size of the droplets. This is affected to some extent by the size of the perforations in the plate 18. The droplets should not be so small that they would be carried upwardly and out of the tower by the blast, but generally the smaller they are the more rapid is removal of silicon and carbon and for a given distance of fall, the more complete the desired reaction. In some tests, holes 1/16 inch in diameter were utilized successfully in a tower 22 feet tall. On the other hand, in the same tower, decarburization was not achieved with a 7/8 inch diameter hole in the perforated plate; while when three 1/2 inch diameter holes were used, partial refinement was attained. Generally, then, there is some correlation between drop size and tower height. Thus, to achieve the same refinement of large droplets as of small requires a taller tower, other conditions being equal. Effective tower height may be changed by insertion or removal of baffles or by raising or lowering the tuyeres.

Another variable is in the purity of the oxygen. Tests have shown that in the process of the invention refinement of molten iron may be achieved with air, oxygen-enriched air or pure oxygen. As used herein and in the appended claims, the term "oxygen" is intended to include any of these. As will be explained below, the purity of the oxygen may be used as a control factor in the process. Of course the lower the purity of the oxygen, the greater total volume of gas that must be used.

Although, as just stated, in the process of the invention it is possible to employ air or oxygen-enriched air as well as pure oxygen for the oxidizing gas, generally for greatest effectiveness of the process it will be found desirable to utilize oxygen of at least 95% purity. The use of the pure gas not only limits the volume of gas to be handled, but also achieves greater conservation of heat in that large volumes of inert gas are not required to be heated. Additionally, a quicker reaction is attained with the use of pure oxygen and, therefore, a shorter tower may be required. Furthermore, as already indicated, under ideal conditions the exhaust gas produced in the process should have a high calorific value and the use of pure oxygen as the oxidizing gas of course would enhance the quality of the exhaust gas as a fuel gas.

The ratio of oxygen to molten metal of the charge is of extreme importance to the successful operation of the process of the invention, technically and economically as well. With proper drop size and tower height, oxygen usage is substantially complete based on oxidation of silicon, manganese, carbon and some iron, that is, nearly all of the oxygen is consumed for oxidation of these elements. The quantity of oxygen should be slightly in excess of the stoichiometric quantity required for oxidation of silicon, manganese and carbon, carbon being oxidized to carbon monoxide. For the desired reactions to take place, it is necessary that some iron be oxidized because of the law of mass action, but the ratio of oxygen to iron should not be greatly in excess of the stoichiometric quantity for the other elements or uneconomically large quantities of iron will be oxidized and oxygen will be wasted.

The temperature of the metal to be treated should be high enough that it does not solidify in the crucible, but ti need not be highly superheated. Metal taken directly from a hot metal mixer is at a suitable temperature. The reactions which take place in the tower are exothermic, and under proper operating conditions the metal received in the reception ladle is at a higher temperature than the untreated metal. As will be explained below, this is of great importance. Successful removal of silicon and carbon has been achieved with initial metal temperatures as low as about 1300° C. and as high as about 1700° C., but as stated above, it is not necessary to heat the metal to such a high temperature.

As indicated above, a number of large-scale tests of the invention have been made. In one such series a tower approximately 22 feet tall and 16 inches inside diameter was used. The tower was lined with fireclay brick of cupola quality, and the crucible and receiving ladle were lined with magnesia cement. In the first five runs reported in the table below, three 1/4 inch, water-cooled tuyeres directed at an upward angle of 15 degrees were employed. In the next to last run reported in the table, four tuyeres of 1/2 inch diameter and located at right angles to the axis of the tower were provided. In the last tabulated run a gas mixture containing 43% oxygen and 57% nitrogen was admitted through four tuyeres of three inch diameter.

| Run No. | Metal Charge, Pounds | Oxygen Flow, Cu. ft./hr. | Time, Minutes | Percent Silicon—Sample No. | | | | | Percent Carbon—Sample No. | | | | |
|---|---|---|---|---|---|---|---|---|---|---|---|---|---|
| | | | | 1 | 2 | 3 | 4 | 5 | 1 | 2 | 3 | 4 | 5 |
| 1 | 300 | 9,000 | 1.90 | 1.03 | 0.99 | 0.98 | | 0.33 | 4.16 | 4.09 | 4.00 | 3.70 | 3.49 |
| 2 | 500 | 12,000 | 1.00 | 0.91 | 0.91 | 0.72 | | 0.03 | 3.77 | 3.60 | 3.60 | | 2.90 |
| 3 | 300 | 12,000 | 2.50 | 0.98 | | | 0.53 | 0.04 | 3.88 | | | 3.80 | 2.08 |
| 4 | 300 | 12,000 | 2.00 | 1.31 | | 0.11 | 0.00 | 0.00 | 3.94 | | | 3.00 | 1.50 |
| 5 | 300 | 12,000 | 2.25 | 1.96 | 1.81 | | | 0.026 | 4.01 | 3.78 | 2.98 | | 2.49 |
| 6 | 1,000 | 20,000 | 2.90 | 1.19 | | | | 0.05 | 4.20 | | | | 1.41 |
| 7 | 1,000 | 20,000 | 2.90 | 1.0 | | | | 0.03 | 4.12 | | | | 2.40 |

In making each run the tower, the crucible, and the receiving ladle were preheated to temperatures in the range 650° C. to 950° C. except for the first, as will be explained below. The oxygen blast was turned on just prior to pouring molten pig iron into the crucible. Samples of iron were taken for analysis from the crucible, several different locations in the tower, and from the receiving ladle. Results of these analyses and other data are reported in the table. In each case sample 1 is the untreated iron, sample 5 is the treated iron, and samples 2, 3, and 4 when taken were each from different preselected locations in the tower. In each of the tests reported except the last, pure oxygen was used as the treating gas.

Examination of the data reported in the table will show that the process of the invention is rapid and effective. Substantially complete removal of silicon from 1000 pounds of molten pig iron and a substantial lowering of its carbon content were accomplished in less than three minutes in the last two runs. From comparison of the data given, it is evident that substantial desiliconization must occur before significant decarburization is attained. In addition to these data, it is pointed out that manganese, too, is nearly completely removed by the process of the invention.

In the first test reported in the table the tower was preheated to only 350° C. In the other tests, in which more effective treatment was attained, the tower was preheated to about 650° C. to 950° C., indicating that preheating of the tower is important to successful operation and that the tower should generally be at a temperature of at least about 650° C. before pouring the metal. Up to the point where the lining would be damaged, the hotter the tower before pouring, the better, for the higher the temperature of the tower, the more effective is removal of silicon and carbon with less oxidation of iron. Of course during continuous operation of the process of the invention the tower will remain heated.

In each of the tests reported, the perforated plate had 50 holes of ⅛ inch diameter initially, except the sixth in which case a plate having nine holes of ¼ inch diameter was utilized and the last in which 12 holes of ¼ inch diameter were used. In the course of the second test the holes became enlarged to about ½ inch; nevertheless substantially complete desiliconization was attained.

In the fifth and sixth tests referred to in the table the temperature of the treated metal was at least 100° C. higher than that of the untreated pig iron.

Under some conditions it may be desirable to provide a flux for the highly silicious slag formed in the process. This can be accomplished simply by adding fluxing material to the receiving ladle or by adding it to the tower by entrainment in the oxygen stream. In the last two heats tabulated above a flux was used, being added to the ladle. In both cases limestone (about 30 pounds) was used, in the sixth test about ½ pound of fluorspar being added.

In all tests considerable boiling in the ladle was observed indicating that reaction continues there, presumably between the metal and iron oxide in the slag. In addition to effecting decarburization of the metal, this ladle reaction promotes recovery of a portion of the iron previously oxidized and thereby improves the overall economy of the process. The use of a flux tends to accelerate such ladle reaction. Generally the flux used should be alkaline. Preferably, lime, limestone, dolomite, or other calcareous material is used.

During operation of the process, considerable volumes of smoke are produced. This smoke may be treated by passing it through any smoke-treating apparatus such as scrubbers, precipitators or the like. A preferred treatment is to pass the smoke into the coke-filled chamber described and claimed in the application of Krivsky and Modl, Ser. No. 547,182, filed November 16, 1955, for Recovery of Iron by Reduction of Iron Oxide.

To achieve the utmost benefit from the process of the invention in the manufacture of steel, and for greatest economy of heat, the process should be so conducted as to produce treated metal at a temperature substantially higher than that of the molten pig iron from the mixer. Most desirably the treated metal should be at a temperature of 1550° C. to 1650° C. Although higher temperatures could be attained, they are not ordinarily desired because of possible damage to refractories. The temperature of the treated metal can be controlled by the introduction of lime or iron oxide in the oxygen stream to lower the temperature or by the degree of dilution of the oxygen with nitrogen. Thus, if the use of pure oxygen would lead to the production of metal at such a high temperature as to be disadvantageous, the oxygen should be diluted with nitrogen or recycled exhaust gases from the tower. On the other extreme, if the use of air alone, under a given set of conditions, does not cause the production of metal at a high enough temperature, the air should be enriched with oxygen.

Conservation of heat is of great importance in the process of the invention, particularly from the standpoint of the steel manufacturer. There are but two sources of heat in the process, the heat in the molten pig iron and the heat of reaction. There are, however, several places for heat losses: the tower, the receiving ladle, and the exhaust gases. For best conservation of heat, the ratio of the mass of molten metal to the mass of the tower and the ladle should be high. For example, calculations have shown that in a tower of 16 inches diameter capable of producing six tons per hour, heat loss to the tower and ladle is about 25% of the total heat input, whereas in a tower of six feet diameter capable of producing 100 tons per hour, heat loss to the tower and ladle is of the order of 4.5%. In the smaller tower about 70% of the total heat input is retained in the metal and slag; in the larger tower about 80% of the total heat input is retained in the metal and slag. The remaining heat loss is accounted for in flue gases. These calculations show that in the larger tower the oxygen may be diluted to a greater extent than in the smaller tower for the attainment of desired metal temperature.

A typical heat balance for a 16 inch diameter, 22 feet tall tower operating with pure oxygen based on one pound of charged hot metal with reference to room temperature (21° C.) follows.

HEAT INPUT

| Heats of Reaction, Percent of Oxidation | Heat of Formation, B.t.u./lb. charged |
| --- | --- |
| 3.5 Carbon | 109.5 |
| 1.1 Silicon | 145.1 |
| 3.0 Iron | 62.4 |
| 0.7 Manganese | 21.4 |
| Total Heat of Reaction | 338.4 |
| Heat Content of Charge at 1300° C | 512 |
| Total Heat Input | 850.4 |

HEAT OUTPUT

| | |
| --- | --- |
| Metal @ 1550° C | 545 |
| Slag | 70 |
| Ladle | 91 |
| Tower | 92 |
| Gas | 52 |
| Total Heat Output | 850 |

During tests of the process of the invention, gas samples as well as metal samples were taken at a number of locations in the tower. Samples taken about ⅓ way up the tower showed that when oxygen was fed at the bottom of the tower it was very soon consumed, being converted to carbon monoxide or carbon dioxide or both.

Metal samples taken at that point and in the receiving ladle showed that desiliconization was substantially complete at that station.

These findings lead to the belief that some silicon removal may be accomplished by reaction with carbon dioxide rather than with oxygen. The reactions occurring in the tower are believed to be represented by the following equations:

$$Si + O_2 = SiO_2$$
$$2C + O_2 = 2CO$$
$$2CO + O_2 = 2CO_2$$
$$Si + 2CO_2 = SiO_2 + 2CO$$
$$Mn + CO_2 = MnO + CO$$
$$Fe + \tfrac{1}{2}O_2 = FeO$$
$$FeO + C = Fe + CO$$
$$2FeO + Si = 2Fe + SiO_2$$
$$Mn + \tfrac{1}{2}O_2 = MnO$$

Whether or not these are the reactions which occur, the fact is that the process of the invention effectively removes silicon and carbon from molten pig iron. It is also possible, and in some cases may be desirable, to remove phosphorus and sulfur from the metal being treated by the introduction of suitable reagents; for example, by introducing sufficient basic flux, such as lime, preferably by entrainment in the gas stream.

It is entirely possible to conduct the process of the invention so as to produce steel in the tower without the need for further refining. However, it is exceptionally well suited to integration into the traditional indirect steelmaking process almost universally employed since it produces a desiliconized, relatively low-carbon molten iron at a high temperature. This hot metal is suitable not only for charging to the open hearth, but, by reason of its low carbon content, is admirably suited to refinement in the arc furnace without incurring the disadvantages encountered in attempting the refinement of molten pig iron from the blast furnace or the hot metal mixer. Therein prehaps lies its greatest practical advantage, for it can make possible the production of the recognized excellent quality steel of the electric arc furnace at far less than its present cost. The use of the hot metal produced by the invention cuts the refining period in the open hearth to not more than about 70% of the normal time.

Utilization of the tower in the method of the invention results in many advantages over prior proposed methods and apparatus for refinement of molten pig iron. For example, the tower makes possible a continuous operation, molten pig iron being fed continuously to a tower and treated metal being discharged continuously. Another outstanding advantage is the absence of prolonged contact of molten metal with refractory as contrasted with that encountered when metal to be treated is held in a vessel such as th econventional converter. Another advantage is the ease of smoke control and treatment for recovery of iron attributable to the use of a tower. Equally important to the steel producer is the relative cheapness of the tower and associated equipment.

From the foregoing description it will be evident to those skilled in the art that many of the specific details given herein by way of illustration may be varied without departing from the invention. The invention accordingly is not limited to such details.

What is claimed is:

1. In the manufacture of steel by the indirect process which comprises smelting iron ore material to produce pig iron and converting such pig iron to steel by removing silicon and carbon therefrom in a refining furnace, the improvement which comprises effecting a partial refinement of such pig iron prior to charging it to said refining furnace, said partial refinement being attained by dispersing a quantity of molten pig iron into discrete droplets, thereby increasing its surface-to-mass ratio; causing said droplets to fall freely and in a substantially vertical path in a tower; introducing into said tower a plurality of opposed, impinging streams of oxidizing gas, the impingement of such streams resulting in a stream of such gas generally substantially parallel to the longitudinal axis of said tower and to the path of fall of said droplets whereby said oxidizing gas is brought into intimate, reactive contact with said droplets over substantially their entire surface portions; thereby effecting removal of silicon and carbon from said droplets, the length of said vertical path of free fall of said droplets and the duration of such contact being sufficient to effect desired refinement thereof in one pass; collecting the molten droplets so treated; and introducing the partially refined, molten pig iron so produced into such refining furnace.

2. The improved process defined in claim 1 wherein said impinging streams of oxidizing gas are introduced at the bottom of said tower and the flow of the resulting oxidizing gas stream is counter to the path of said droplets.

3. In the manufacture of steel by the indirect process which comprises smelting iron ore material to produce pig iron and converting such pig iron to steel by removing silicon and carbon therefrom in a refining furnace, the improvement which comprises effecting a partial refinement of such pig iron prior to charging it to said refining furnace, said partial refinement being attained by introducing a quantity of molten pig iron in discrete droplets into the top of a tower; introducing a plurality of opposed, impinging streams of oxygen into the bottom of said tower, the impingement of such streams resulting in a stream of oxygen substantially parallel to the longitudinal axis of said tower; causing said droplets of iron to fall freely and in a substantially vertical path in said tower while in prolonged contact, throughout substantially their entire free fall, with said oxygen and the products of reaction of said oxygen with said pig iron, the paths of said streams and of said droplets thus being generally substantially parallel, whereby said oxygen and reaction products are brought into intimate, reactive contact with said droplets over substantially their entire surface portions, the length of such paths and the duration of such contact being sufficient to effect desired refinement of said droplets in one pass; collecting said molten droplets at the bottom of said tower; and introducing the partially refined pig iron so produced into such refining furnace in the molten condition.

4. The improved process defined by claim 3 wherein said oxygen stream is of at least 95% purity.

5. The process of refining molten pig iron which comprises dispersing a quantity of molten pig iron into discrete droplets; introducing such droplets into a tower and causing them to fall freely therein and in a substantially vertical path; introducing a plurality of opposed, impinging streams of oxygen into said tower at the bottom thereof, the impingement of said streams resulting in a flowing stream of oxygen substantially parallel to the longitudinal axis of said tower; subjecting said falling droplets of the prolonged action, throughout substantially their entire free fall, of said flowing stream of oxygen and reaction products thereof with said droplets, the paths of said stream and said droplets thus being countercurrent and generally parallel, whereby said oxygen and reaction products are brought into intimate, reactive contact with said droplets over substantially their entire surface portions, the length of such paths and the duration of such contact being sufficient to effect desired refinement of said droplets in one pass; and collecting the droplets so treated.

6. The process defined in claim 5 wherein said oxygen is of at least 95% purity.

7. The process defined in claim 6 wherein the proportion of oxygen to iron is so regulated that the treated droplets are at a higher temperature than the untreated molten pig iron.

8. The process defined in claim 5 wherein the proportion of oxygen to the proportion of carbon in the molten pig iron to be treated is so regulated than substantially all of said oxygen is consumed in oxidation of such carbon to carbon dioxide and removal of silicon from such iron is accomplished by the carbon dioxide so formed.

9. The process defined in claim 5 wherein a quantity of oxygen at least equal to 100% of that theoretically required to combine with the silicon, manganese and carbon contents of said molten iron, carbon being oxidized to carbon monoxide, is utilized.

10. The process of refining molten pig iron which comprises pouring a quantity of such iron through a perforated member to disperse such iron into discrete droplets; causing said droplets to fall freely and in a substantially vertical path in a vertical tower; introducing a plurality of opposed, impinging streams of oxygen into said tower at the bottom thereof, the impingment of said opposing streams resulting in a flowing stream the path of which is generally parallel to the longitudinal axis of said tower and substantially parallel and counter to the path of fall of said droplets; and subjecting said droplets to prolonged, intimate, reactive contact, over substantially their entire surface portions and throughout substantially their entire free fall, with said oxygen and its reaction products with said iron until at least partial removal of silicon and carbon is effected, the size of said droplets and the length of said fall being so proportioned that substantially all of the silicon of said iron is removed therefrom prior to completion of said fall.

11. The process defined by claim 10 wherein the temperature of the molten pig iron before treatment is in the range 1300° C. to 1700° C., the oxygen is of at least 95% purity and the oxygen flow is so regulated that the temperature of the treated metal is higher than that of the untreated metal, such increase in temperature being attained solely by reaction of such oxygen with the pig iron being treated.

12. The process of refining molten pig iron containing about 0.75% to 2.5% silicon; 0.5% to 2% manganese; 3.5% to 4.5% carbon; remainder iron and incidental impurities, which comprises pouring a quantity of such iron through a perforated member to disperse such iron into discrete droplets; causing said droplets to fall freely and in a substantially vertical path in a vertical tower; introducing a plurality of opposed, impinging streams of oxygen into said tower at the bottom thereof, the impingment of said streams resulting in a flowing stream of oxygen, the path of which is generally parallel to the longitudinal axis of said tower and substantially parallel and counter to the path of fall of said droplets; and subjecting said droplets to prolonged, intimate, reactive contact, over substantially their entire surface portions and throughout substantially their entire free fall, with said oxygen and its reaction products with said iron until at least partial removal of silicon and carbon is effected, the size of said droplets and the length of said fall being so proportioned that substantially all of the silicon of said iron is removed therefrom prior to completion of said fall.

13. The process defined by claim 12 wherein the temperature of the molten pig iron before treatment is in the range 1300° C. to 1700° C. and the oxygen flow is so regulated that the temperature of the treated metal is higher than that of the untreated metal, such increase in temperature being attained solely by reaction of such oxygen with the pig iron being treated.

14. The process of refining molten pig iron which comprises dispersing a quantity of molten pig iron into discrete droplets; introducing such droplets into a tower and causing them to fall freely therein and in a substantially vertical path; introducing a plurality of opposed, impinging streams of oxygen into said tower at the bottom thereof, the impingment of said streams resulting in a flowing stream of oxygen generally substantially parallel to the longitudinal axis of said tower and substantially parallel and countercurrent to the paths of said falling droplets; subjecting said falling droplets to the prolonged action, throughout substantially their entire free fall, of said flowing stream of such oxygen and reaction products thereof with said droplets; whereby said oxygen and reaction products are brought into intimate, reactive contact with said droplets over substantially their entire surface portions, the length of such paths and the duration of such contact being sufficient to effect removal of silicon and carbon from said droplets and to produce a slag containing iron oxide; collecting the droplets of molten metal so treated; holding said molten metal in contact with said slag until reaction between said iron oxide in said slag and said molten metal is substantially complete and then separating said slag from said molten metal.

15. The process defined by claim 14 wherein a flux is added to said slag.

16. The process defined by claim 15 wherein said flux is introduced into said tower by entrainment in said oxygen stream.

17. The improved process defined by claim 4 wherein said droplets are formed by pouring said molten pig iron through a perforated member at the top of said tower.

18. The improved process defined by claim 5 wherein said droplets are formed by pouring said molten pig iron through a perforated member at the top of said tower.

References Cited in the file of this patent

UNITED STATES PATENTS

| | | |
|---|---|---|
| 50,804 | Derby et al. | Nov. 7, 1865 |
| 137,025 | Rand | Mar. 18, 1873 |
| 558,947 | Hawkins | Apr. 28, 1896 |
| 1,145,506 | Pasquier | July 6, 1915 |
| 1,939,874 | Brassert | Dec. 19, 1933 |
| 2,781,255 | Krivsky et al. | Feb. 12, 1957 |

FOREIGN PATENTS

| | | |
|---|---|---|
| 44 | Great Britain | 1856 |
| 622,419 | Great Britain | May 2, 1949 |
| 642,084 | Great Britain | Aug. 30, 1950 |

UNITED STATES PATENT OFFICE

CERTIFICATE OF CORRECTION

Patent No. 2,915,380 December 1, 1959

Donald C. Hilty

It is hereby certified that error appears in the printed specification of the above numbered patent requiring correction and that the said Letters Patent should read as corrected below.

Column 8, line 57, for "droplets of" read --- droplets to ---.

Signed and sealed this 5th day of July 1960.

(SEAL)
Attest:

KARL H. AXLINE
Attesting Officer

ROBERT C. WATSON
Commissioner of Patents